(12) United States Patent
Way et al.

(10) Patent No.: US 10,761,527 B2
(45) Date of Patent: Sep. 1, 2020

(54) INTEGRATION PLATFORM FOR AUTONOMOUS VEHICLES

(71) Applicant: UATC, LLC, San Francisco, CA (US)

(72) Inventors: Matthew James Way, Pittsburgh, PA (US); Leigh Gray Hagestad, San Francisco, CA (US); Andrii Iasynetskyi, Millbrae, CA (US); Mark Yen, San Francisco, CA (US); Brent Justin Goldman, San Francisco, CA (US)

(73) Assignee: UATC, LLC, San Francisco, CA (US)

( * ) Notice: Subject to any disclaimer, the term of this patent is extended or adjusted under 35 U.S.C. 154(b) by 0 days.

(21) Appl. No.: 16/174,974

(22) Filed: Oct. 30, 2018

(65) Prior Publication Data

US 2020/0033847 A1    Jan. 30, 2020

Related U.S. Application Data

(60) Provisional application No. 62/711,150, filed on Jul. 27, 2018.

(51) Int. Cl.
*G08G 1/00*     (2006.01)
*G05D 1/00*     (2006.01)
(Continued)

(52) U.S. Cl.
CPC .......... *G05D 1/0022* (2013.01); *G05D 1/0027* (2013.01); *G05D 1/0088* (2013.01);
(Continued)

(58) Field of Classification Search
CPC .. G05D 1/0088; G05D 1/0022; G05D 1/0027; G05D 2201/0212; G06Q 10/00;
(Continued)

(56) References Cited

U.S. PATENT DOCUMENTS 8,601,595 B2   12/2013   Gelvin et al.
9,014,888 B2   4/2015   Sukkarié et al.
(Continued)

FOREIGN PATENT DOCUMENTS

WO    WO 2017026992    2/2017

OTHER PUBLICATIONS

Matthew James Way, et al., U.S. Appl. No. 15/896,276, filed Feb. 14, 2018, Systems and Methods for a Vehicle Application Programming Interface.
(Continued)

*Primary Examiner* — Dalena Tran
(74) *Attorney, Agent, or Firm* — Dority & Manning, P.A.

(57) ABSTRACT

Systems and methods are directed to facilitating secure, bidirectional communications between autonomous vehicles associated with a plurality of entities and a provider infrastructure. In one example, a computer-implemented method for facilitating communications with a vehicle includes obtaining, by a computing system comprising one or more computing devices, a communication associated with an autonomous vehicle via an application programming interface platform, wherein the application programming interface platform comprises a plurality of vehicle services interfaces. The method further includes determining, by the computing system, an entity-type of the autonomous vehicle. The method further includes determining, by the computing system, a vehicle services interface of the plurality of vehicle services interfaces based at least in part on the communication associated with the autonomous vehicle and the entity-type. The method further includes providing, by the computing system, the communication associated with the autonomous vehicle to a system client via the vehicle services interface.

20 Claims, 8 Drawing Sheets

(51) Int. Cl.
  *H04W 4/44* (2018.01)
  *G07C 5/00* (2006.01)
(52) U.S. Cl.
  CPC .............. *G07C 5/008* (2013.01); *H04W 4/44* (2018.02); *G05D 2201/0213* (2013.01)
(58) Field of Classification Search
  CPC .. G06Q 50/30; G06Q 10/06; G06Q 10/06315; G06Q 50/10; G08G 1/202; G08G 1/166; Y04S 10/54
  USPC ................ 700/245; 701/23; 718/1, 102–105; 719/328, 329, 318–321; 726/2–7, 14, 17
  See application file for complete search history.

(56) References Cited

U.S. PATENT DOCUMENTS

| | | | |
|---|---|---|---|
| 9,459,622 B2 | 10/2016 | Abhyanker | |
| 9,547,309 B2 | 1/2017 | Ross et al. | |
| 9,547,985 B2 | 1/2017 | Tuukkanen | |
| 9,606,794 B1 | 3/2017 | Chou et al. | |
| 2003/0014521 A1* | 1/2003 | Elson | G06F 9/5011 709/225 |
| 2009/0077267 A1 | 3/2009 | Alrabady et al. | |
| 2012/0011067 A1 | 1/2012 | Katzin et al. | |
| 2012/0089684 A1 | 4/2012 | Angus et al. | |
| 2015/0339928 A1* | 11/2015 | Ramanujam | G08G 1/202 701/23 |
| 2017/0078398 A1 | 3/2017 | Haidar et al. | |
| 2017/0178504 A1 | 6/2017 | Gotoh et al. | |
| 2017/0255966 A1 | 9/2017 | Khoury | |
| 2017/0264688 A1 | 9/2017 | Sell et al. | |
| 2018/0053141 A1* | 2/2018 | Shydo, Jr. | G05D 1/104 |
| 2018/0097804 A1 | 4/2018 | Boehm | |
| 2018/0189917 A1 | 7/2018 | Shen et al. | |
| 2018/0350160 A1* | 12/2018 | Sainaney | G07C 5/006 |
| 2019/0025819 A1* | 1/2019 | Ferguson | G05D 1/0027 |

OTHER PUBLICATIONS

Matthew James Way, et al., U.S. Appl. No. 15/918,588, filed Mar. 12, 2018, Autonomous Vehicle Application Programming Interface and Communications Systems and Methods.
Matthew James Way, et al., U.S. Appl. No. 15/918,599, filed Mar. 12, 2018, Autonomous Vehicle Application Programming Interface and Communications Systems and Methods.
PCT International Search Report and Written Opinion for PCT/US2018/055127, dated Jan. 29, 2019, 15 pages.
International Search Report and Written Opinion for Application No. PCT/US2019/043664, dated Sep. 12, 2019, 13 pages.

* cited by examiner

INTEGRATION PLATFORM FOR AUTONOMOUS VEHICLES

PRIORITY CLAIM

The present application is based on and claims benefit of U.S. Provisional Application 62/711,150 having a filing date of Jul. 27, 2018, which is incorporated by reference herein.

FIELD

The present disclosure relates generally to provisioning of services for autonomous vehicles. More particularly, the present disclosure relates to systems and methods that provide for improved communications between autonomous vehicles associated with a plurality of entities and one or more computing system(s) associated with a service provider that are remote from the autonomous vehicles, and vice versa.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. This can allow an autonomous vehicle to navigate without human intervention and, in some cases, even omit the use of a human driver altogether.

More particularly, an entity (e.g., service provider, owner, manager) can use one or more vehicles (e.g., ground-based vehicles) to provide a vehicle service such as a transportation service (e.g., rideshare service), a courier service, a delivery service, etc. The vehicle(s) can be autonomous vehicles that include various systems and devices configured to control the operation of the vehicle.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for facilitating communications with a vehicle. The method includes obtaining, by a computing system comprising one or more computing devices, a communication associated with an autonomous vehicle via an application programming interface platform, wherein the application programming interface platform comprises a plurality of vehicle services interfaces. The method further includes determining, by the computing system, an entity-type of the autonomous vehicle. The method further includes determining, by the computing system, a vehicle services interface of the plurality of vehicle services interfaces based at least in part on the communication associated with the autonomous vehicle and the entity-type. The method further includes providing, by the computing system, the communication associated with the autonomous vehicle to a system client via the vehicle services interface.

Another example aspect of the present disclosure is directed to a computing system. The computing system includes one or more processors and one or more memories including instructions that, when executed by the one or more processors, cause the one or more processors to perform operations. The operations include obtaining a communication associated with an autonomous vehicle via an application programming interface platform, wherein the application programming interface platform comprises a plurality of vehicle trip services interfaces. The operations further include determining an entity-type of the autonomous vehicle. The operations further include determining a vehicle trip services interface of the plurality of vehicle trip services interfaces based at least in part on the communication associated with the autonomous vehicle and the entity-type. The operations further providing the communication associated with the autonomous vehicle to a system client via the vehicle trip services interface.

Another example aspect of the present disclosure is directed to an infrastructure system. The infrastructure system includes an integration platform. The vehicle computing system includes a plurality of vehicle services interfaces configured to facilitate communication with one or more system clients associated with the infrastructure system; a plurality of application programming interfaces configured to facilitate communication with one or more external computing systems and the plurality of vehicle services interfaces; and one or more computing systems. The one or more computing systems include one or more processors; and one or more memories including instructions that, when executed by the one or more processors, cause the one or more processors to perform operations. The operations include obtaining, by a first application programming interface, a communication associated with an autonomous vehicle. The operations further include determining an entity-type of the autonomous vehicle, wherein the entity-type is determined from a predefined group of entity-types. The operations further include determining a vehicle services interface of the plurality of vehicle services interfaces based at least in part on the communication associated with the autonomous vehicle and the entity-type. The operations further providing the communication associated with the autonomous vehicle to at least one of the one or more system clients associated with the infrastructure system via the vehicle services interface.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
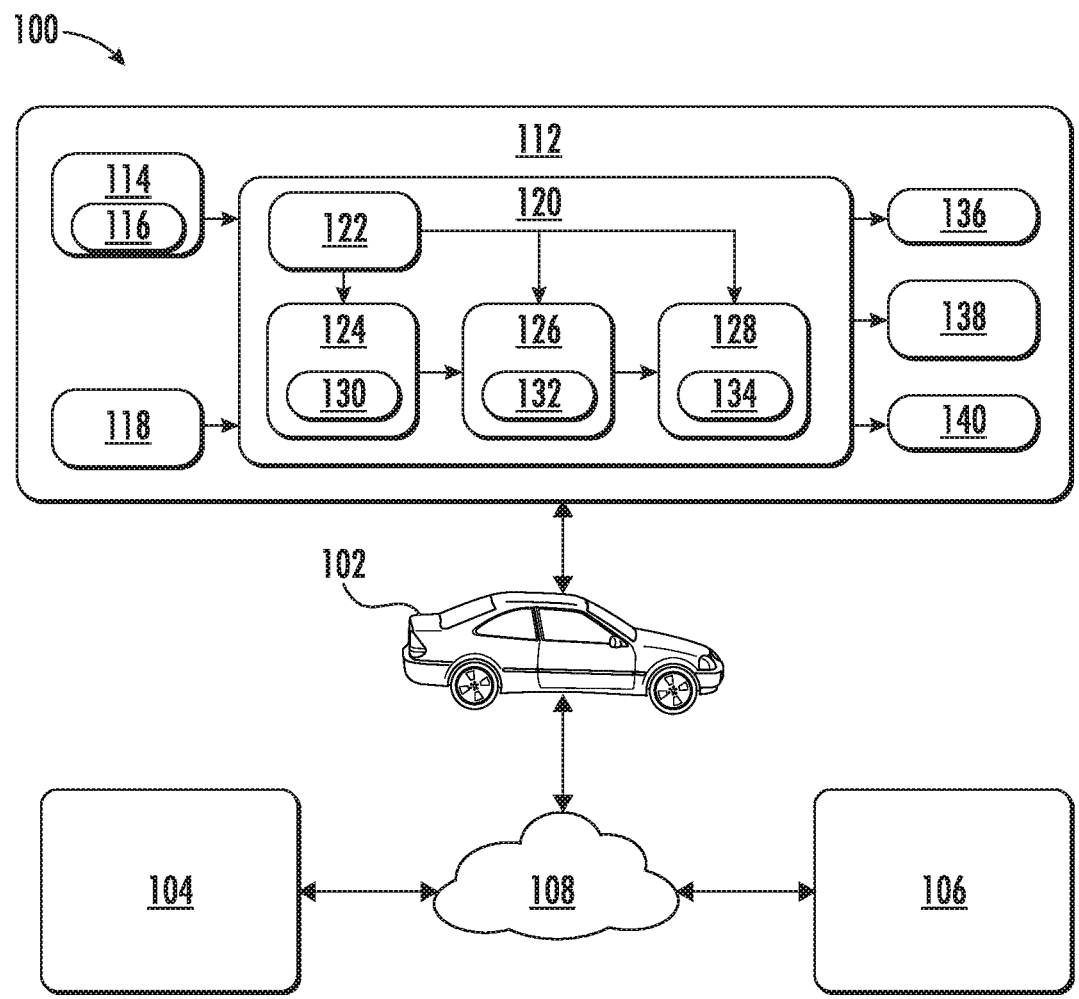
FIG. 1 depicts a block diagram of an example system for controlling the navigation of an autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to providing improved communications between autonomous vehicles associated with a plurality of entities and one or more computing system(s) associated with a service provider that are remote from the autonomous vehicles, and vice versa. In particular, the systems and methods of the present disclosure can facilitate secure, bidirectional communications between autonomous vehicles associated with a plurality of entities and a provider infrastructure such as, for example, a service provider's operations system (e.g., including a data center). To do so, the provider infrastructure can include a platform comprising one or more application programming interfaces (APIs) that are configured to allow autonomous vehicles associated with one or more entities and one or more provider infrastructure endpoints (e.g., system clients, etc.) to efficiently communicate.

In particular, the systems and methods of the present disclosure can provide one or more platforms to facilitate and manage communications between autonomous vehicles associated with a plurality of entities and one or more backend systems of a service provider entity. For example, a service provider infrastructure can include a "public" platform and a "private" platform which can facilitate communication between autonomous vehicles and one or more service provider infrastructure endpoints to provide for facilitating services provided by the autonomous vehicles. As a further example, the public platform associated with the service provider infrastructure can facilitate communication between the service provider infrastructure and autonomous vehicles associated with the service provider, as well as between the service provider infrastructure and one or more other entities (e.g., third-party entities (other than the service provider) managing autonomous vehicle fleets, etc.). The public platform can allow for services-related communication (e.g., trip services, routing services, etc.) between the service provider infrastructure and the autonomous vehicles and/or other entity system(s) (e.g., third-party entity systems managing autonomous vehicle fleets). Additionally, the private platform associated with the service provider infrastructure can facilitate communication between the service provider infrastructure and autonomous vehicles associated with the service provider. The private platform can allow for communication associated with the service provider autonomous vehicle-specific services (proprietary/internal services) in the service provider infrastructure (e.g., fleet management, remote autonomy assistance, etc.) between the service provider infrastructure and the autonomous vehicles of the service provider.

More particularly, an entity (e.g., service provider, owner, manager) can use one or more vehicles (e.g., ground-based vehicles) to provide a vehicle service such as a transportation service (e.g., rideshare service), a courier service, a delivery service, etc. The vehicle(s) can be autonomous vehicles that include various systems and devices configured to control the operation of the vehicle. For example, an autonomous vehicle can include an onboard vehicle computing system for operating the autonomous vehicle (e.g., located on or within the autonomous vehicle). The vehicle computing system can obtain sensor data from sensor(s) onboard the vehicle (e.g., cameras, LIDAR, RADAR), attempt to comprehend the vehicle's surrounding environment by performing various processing techniques on the sensor data, and generate an appropriate motion plan through the vehicle's surrounding environment. Moreover, an autonomous vehicle can be configured to communicate with one or more computing devices that are remote from the vehicle. For example, the autonomous vehicle can communicate with a remote computing system that can be associated with the entity, such as the entity's operations computing system. The operations computing system can include a plurality of system clients that can help the entity monitor, communicate with, manage, etc. autonomous vehicles. In this way, the entity can manage the autonomous vehicles to provide the vehicle services of the entity.

The autonomous vehicles utilized by the entity to provide the vehicle service can be associated with a fleet of the entity or a third-party. For example, the entity (e.g., the service provider) may own, lease, etc. a fleet of autonomous vehicles that can be managed by the entity (e.g., the system clients) to provide one or more vehicle services. An autonomous vehicle utilized to provide the vehicle service(s) can be included in this fleet of the entity. In some implementations, an autonomous vehicle can be associated with a third-party such as, for example, an individual, an original equipment manufacturer (OEM), or another entity. Even though such an autonomous vehicle may not be included in the fleet of autonomous vehicles of the entity, the platforms of the present disclosure can allow the autonomous vehicle to still be utilized to provide the vehicles services offered by the entity, access its system clients, etc.

According to an aspect of the present disclosure, a provider entity infrastructure can include a public platform and a private platform to facilitate services between the provider entity infrastructure and autonomous vehicles associated with one or more entities (e.g., associated with the provider, associated with third-party vendors, etc.). The public platform can facilitate access to provider services by autonomous vehicles associated with the provider and by autonomous vehicles associated with one or more third-party vendors. The public platform can provide access to provider services such as trip assignment services, routing services, supply positioning services, payment services and/or the like. The private platform can provide access to provider services that are specific to the provider autonomous vehicle fleet such as fleet management services, autonomy assistance services, and/or the like. Both the public platform and the private platform each include a Gateway API to facilitate communication from the autonomous vehicles to the provider backend infrastructure services (e.g., backend system clients, etc.) and a Vehicle API to facilitate communication from the provider backend infrastructure services to the autonomous vehicles. Each of the platform's APIs can have separate responsibilities, monitoring, alerting, tracing, service level agreements (SLAs), and/or the like.

For example, the public platform Gateway API can abstract the provider infrastructure from the provider autonomous vehicles and third-party vendor autonomous vehicles and facilitate requests from both the provider autonomous vehicles and third-party vendor autonomous vehicles to communicate with the provider backend infrastructure. The public platform Vehicle API can abstract the provider autonomous vehicles and third-party vendor autonomous vehicles from the provider infrastructure and facilitate requests from the provider infrastructure backend services to communicate with both the provider autonomous vehicles and third-party vendor autonomous vehicles. The private Gateway API can abstract the provider infrastructure from the provider autonomous vehicles and facilitate requests from the provider autonomous vehicles to communicate with the provider backend infrastructure. The private platform Vehicle API can abstract the provider autonomous vehicles from the provider infrastructure and facilitate requests from the provider infrastructure backend services to communicate with the provider autonomous vehicles.

More particularly, the platforms can be logically consolidated points of ingress and egress of all communications from and/or to the autonomous vehicles (and/or third-party vendor systems) and a service provider infrastructure. Moreover, the platforms can be logical constructs that contain all vehicle and/or service facing interfaces. Such vehicle services interfaces can be configured as computing structures for establishing a communication connection between distinct components of a system. For example, the platform can include a plurality of backend interfaces (e.g., vehicle services interfaces). Each backend interface can be associated with at least one system client. A system client can be the hardware and/or software implemented on a computing system (e.g., of the service provider) that is remote from the autonomous vehicle and that provides a particular back-end service to an autonomous vehicle (e.g., scheduling of vehicle service assignments, routing services, etc.). A backend interface can be the interface (e.g., a normalized interface) that allows one application and/or system (e.g., of the autonomous vehicle) to provide data to and/or obtain data from another application and/or system (e.g., a system client). Each backend interface can have one or more functions that are associated with the particular backend interface. The autonomous vehicle can provide a communication to the platform to call a function of a backend interface. In this way, the backend interfaces can be an external facing edge of the service provider infrastructure that is responsible for providing a secure tunnel for a vehicle and/or other system to communicate with a particular system client so that the vehicle and/or other system can utilize the backend service associated with that system client, and vice versa.

The provider entity infrastructure can include an API proxy to act as a central gateway to the public platform as well as provide an API management platform to provide security, reliability, scalability, and abstraction for the backend services. For example, in some implementations, the API proxy can provide authentication and security (e.g., access control), throttling and/or rate limiting, caching, API management tools, schema validation, analytics, development tools, standardized logon and metrics, and/or the like.

The provider entity infrastructure can include software development kits (SDKs) (e.g., set of tools and core libraries) that provide access to the platform for use by both the provider autonomous vehicles and the third-party vendor autonomous vehicles. In some implementations, all external communication with the platforms can be done via the SDKs. For example, the provider entity infrastructure can include both a public SDK and a private SDK and specific endpoints to facilitate communication with the platforms. The provider autonomous vehicle fleet can use both the public SDK and the private SDK, whereas the third-party vendor autonomous vehicle fleet can use only the public SDK and associated endpoints. In some implementations, the SDKs can provide a single entry point into the provider infrastructure, which can improve consistency across both the provider fleet and the third-party vendor fleet(s). As an example, a public SDK can provide secured access to the public platform by both service provider vehicles and third-party vendor vehicles (and/or systems) and access to capabilities such as trip assignment, routing, onboarding new vehicles, supply positioning, monitoring and statistics, a platform sandbox (e.g., for integration and testing), and/or the like. The private SDK can be accessed by the service provider vehicles and access to capabilities such as remote assistance, vehicle management, fleet management, and/or the like. In some implementations, an SDK can allow for providing of usage statistics, for example, based on explicit permission from a third-party vendor (e.g., opt-in). The SDK can provide for collecting the usage statistics and providing them to one or more service provider infrastructure endpoints (e.g., system clients, etc.). In some implementations, the usage statistics are anonymized and can be protected from internal access and exposure. In some implementations, the SDKs can include command-line tools to provide an entry point into the SDK components. For example, the command-line tools can provide for bootstrapping, managing authentication, updating SDK version, testing, debugging, and/or the like.

As one example, an autonomous vehicle (and/or other entity fleet management system) can generate a communication associated with the autonomous vehicle that is to be provided to a service provider infrastructure. The communication can be provided to a public platform associated with the service provider infrastructure, for example, via a SDK associated with the autonomous vehicle (and/or other entity fleet management system, service provider autonomous vehicle private platform, etc.) and an API proxy associated with the public platform. If the communication is associated with an autonomous vehicle of the service provider fleet (e.g., a first entity-type), the communication can be provided to an appropriate system client in the service provider infrastructure (e.g., a system client providing public services, a system client providing internal (provider fleet-specific) services, etc.) via a Gateway API and an associated backend service interface in the public platform. If the communication is associated with an autonomous vehicle of a third-party provider fleet (e.g., a second entity-type) it can be provided to an appropriate system client in the service provider infrastructure (e.g., a system client providing public services, such as trip assignment service, routing service, etc.) via a Gateway API and an associated backend service interface in the public platform. The public platform can also facilitate providing data from a system client to an autonomous vehicle, for example, via a Vehicle API and public platform API proxy to an SDK associated with the autonomous vehicle (and/or other entity fleet management system, service provider autonomous vehicle private platform, etc.).

According to another aspect of the present disclosure, the platforms can provide for different modes of communication between autonomous vehicles and/or other systems (e.g., private platform, third-party vendor systems, etc.) and the service provider infrastructure. For example, two primary communication modes, direct-to-vehicle and direct-to-vendor, can be provided. In a direct-to-vehicle mode, an autonomous vehicle can connect directly to the public platform (e.g., the API proxy, etc.) through the SDK associated with the vehicle. In a direct-to-vendor mode, an autonomous vehicle can communicate directly with their own services (e.g., private platform, third-party vendor system, etc.), and those services can connect to the public platform via a SDK associated with that service. In some implementations, another communication mode, hybrid vendor, can be provided. A hybrid vendor mode can support both direct-to-vehicle and direct-to-vendor communication modes. For example, in a hybrid vendor mode, some communications (e.g., normal communications) can be provided through direct-to-vendor communication mode and other communications (e.g., time-sensitive communications) can be provided through direct-to-vehicle communication mode.

In some implementations, the platforms can provide for chain-based certificates to provide security, whereby certificates are hierarchical and traceable. For example, chain-based certificates provide for certificate chaining to establish hierarchical chains of trust that extend to each vendor and to each of the vendor's autonomous vehicles. The chain-based model can allow for revoking a certificate for a single autonomous vehicle and for revoking a certificate for the entire vendor fleet.

The systems and methods described herein provide a number of technical effects and benefits. For instance, the systems and methods can provide for abstracting a vehicle platform from an operations system infrastructure. For example, an application programming interface platform according to the present disclosure can provide for reasoning about vehicles (e.g., autonomous vehicles and/or compute capable vehicles) more generically such that an entity can easily introduce different vehicles (e.g., vehicles included in the entity's fleet, vehicles from different third parties, etc.) to the operations system, thereby allowing for easier and/or faster expansion of the entity's vehicle services.

The systems and methods described herein can provide technical effects and benefits including providing for quickly aggregating data from a large number of vehicles. For example, in some implementations, the platforms can concurrently be in communication with a large number of vehicles and can quickly route data to and/or from multiple vehicles to a plurality of system clients.

The systems and methods described herein can provide technical effects and benefits including providing for a decentralized system that can provide increased scalability. For example, the platforms can provide an architecture, such as the backend interfaces (e.g., acting as communication pipelines), message routing and/or the like, that allow for significant scalability in terms of processing data from any number of vehicles. Such scalability can provide for more processing off-board the vehicle allowing for more complex processing of vehicle data than can be done onboard the vehicle.

The systems and methods of the present disclosure can provide an improvement to vehicle computing technology, such as autonomous vehicle computing technology and the remote computing systems associated therewith. For instance, the platforms, application programming interfaces, systems, and methods of the present disclosure provide a more secure and computationally efficient approach to communicating data to and/or from autonomous vehicles and computing systems remote from the autonomous vehicles. For example, a computing system (e.g., of an autonomous vehicle) can generate a communication associated with the autonomous vehicle. The vehicle computing system can provide the communication to a platform API that is remote from the autonomous vehicle. As described herein, the platform can be configured to provide the communication to a system client via a backend interface of a plurality of backend interfaces of the platform. Each of the plurality of backend interfaces can be associated with at least one of a plurality of system clients. By utilizing a plurality of backend interfaces, the platform can provide secure multiplexing of data over different communication streams. Moreover, the backend interfaces can help allow the platform to provide an improved system via which autonomous vehicles (and/or another system) can communicate with system clients of a service provider.

With reference to the figures, example embodiments of the present disclosure will be discussed in further detail.

FIG. 1 depicts a block diagram of an example system 100 for controlling the navigation of a vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more vehicle services to a plurality of users via a fleet of vehicles that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), with the provision of vehicle services, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that includes data including vehicle status data associated with the status of vehicles including the vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devise 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 102 including a location (e.g., a latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile), an aircraft, and/or another type of vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, the vehicle 102 can provide data indicative of the state of the vehicle, the state of one or more passengers of the vehicle, and/or the state of an environment to the operations computing system 104, which can store an indication, record, and/or other data indicative of the state of the one or more objects within a predefined distance of the vehicle 102 in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

As depicted in FIG. 1, the vehicle computing system 112 can include the one or more autonomy system sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the vehicle 102 including a front side, rear side, left side, right side, top, or bottom of the vehicle 102. The autonomy sensor data 116 can be indicative of locations associated with the one or more objects within the surrounding environment of the vehicle 102 at one or more times. For example, autonomy sensor data 116 can be indicative of one or more LIDAR point clouds associated with the one or more objects within the surrounding environment. The one or more autonomy system sensors 114 can provide the autonomy sensor data 116 to the autonomy computing system 120.

In addition to the autonomy sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the autonomy sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the vehicle 102 according to the motion plan.

The perception system 124 can identify one or more objects that are proximate to the vehicle 102 based on autonomy sensor data 116 received from the autonomy system sensors 114. In particular, in some implementations, the perception system 124 can determine, for each object, state data 130 that describes a current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a presentation of the world around an vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the system on-board the vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat).

Figure 2:
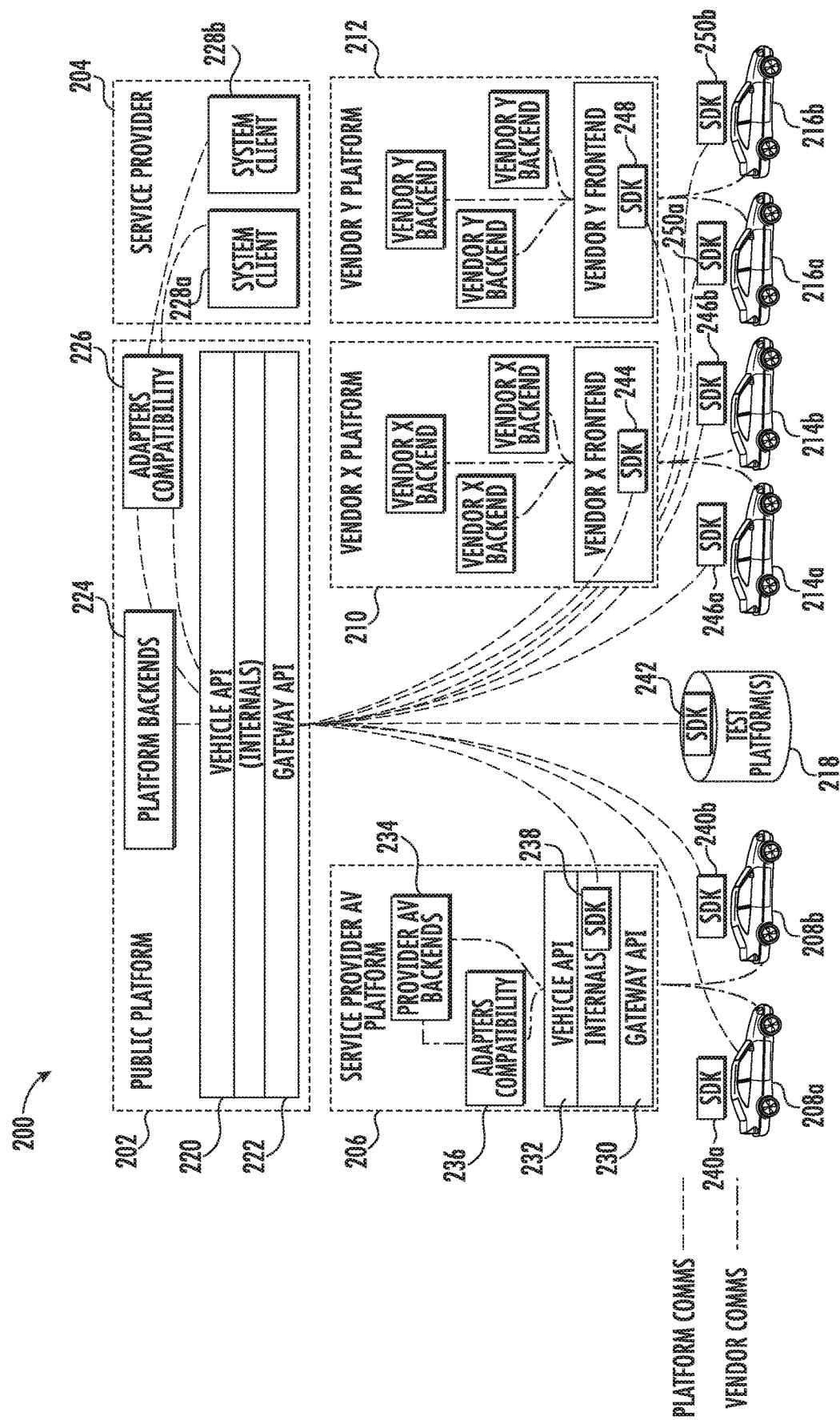
FIG. 2 depicts an example infrastructure system according to example embodiments of the present disclosure.

FIG. 2 depicts an example service infrastructure 200 according to example embodiments of the present disclosure. As illustrated in FIG. 2, an example service infrastructure 200, according to embodiments of the present disclosure, can include an application programming interface platform (e.g., public platform) 202, a service provider system 204, a service provider autonomous vehicle platform (e.g., private platform) 206, one or more service provider autonomous vehicles (e.g., in a service provider fleet) such as autonomous vehicles 208a and 208b, and one or more test platforms 218. Additionally, the service infrastructure 200 can also be associated with and/or in communication with one or more third-party entity systems such as vendor platforms 210 and 212, and/or one or more third-party entity autonomous vehicles (e.g., in a third-party entity autonomous vehicle fleet) such as third-party autonomous vehicles 214a, 214b, 216a, and 216b.

As described herein, a service infrastructure 200 can include a public platform 202 to facilitate vehicle services (e.g., provided via one or more system clients (228a, 228b) associated with a service provider operations computing system) between the service provider infrastructure system 204 (e.g., operations computing system, etc.) and vehicles associated with one or more entities (e.g., associated with the service provider (208a, 208b), associated with third-party entities (214a, 214b, 216a, 216b), etc.). For example, in some embodiments, the public platform 202 can provide access to service provider services (e.g., associated with the service provider system 204) such as trip assignment services, routing services, supply positioning services, payment services, and/or the like.

The public platform 202 can include a gateway API (e.g., gateway API 222) to facilitate communication from the autonomous vehicles to the service provider infrastructure services (e.g., system clients 228a, 228b, etc.) and a vehicle API (e.g., vehicle API 220) to facilitate communication from the service provider infrastructure services (e.g., system clients 228a, 228b, etc.) to the autonomous vehicles (e.g., 208a, 208b, 214a, 214b, 216a, 216b).

In some embodiments, the public platform 202 can be a logical construct that contains all vehicle and/or service facing interfaces. The public platform 202 can include a plurality of vehicle services interfaces (e.g., public platform backend interfaces 224). Each backend interface 224 can be associated with at least one system client (e.g., service provider system 204 clients such as system clients 228a and 228b). A system client (e.g., 228a, 228b, etc.) can be the hardware and/or software implemented on a computing system (e.g., operations computing system of the service provider) that is remote from the autonomous vehicle and that provides a particular back-end service to an autonomous vehicle (e.g., scheduling of vehicle service assignments, routing services, payment services, user services, etc.). A backend interface 224 can be the interface (e.g., a normalized interface) that allows one application and/or system (e.g., of the autonomous vehicle) to provide data to and/or obtain data from another application and/or system (e.g., a system client). Each backend interface 224 can have one or more functions that are associated with the particular back-end interface. An autonomous vehicle can provide a communication to the public platform 202 to call a function of a backend interface. In this way, the backend interfaces can be an external facing edge of the service provider infrastructure system 204 that is responsible for providing a secure tunnel for a vehicle and/or other system to communicate with a particular service provider system client (e.g., 228a, 228b, etc.) so that the vehicle and/or other system can utilize the backend service associated with that particular service provider system client (e.g., 228a, 228b, etc.), and vice versa.

In some embodiments, the public platform 202 can include one or more adapters 226, for example, to provide compatibility between one or more backend interfaces 224 and one or more service provider system clients (e.g., 228a, 228b, etc.). In some embodiments, the adapter(s) 226 can provide upstream and/or downstream separation between the service provider operations computing system 204 (e.g., system clients 228a, 228b, etc.) and the public platform 202 (e.g., backend interfaces 224, etc.). In some embodiments, the adapter(s) 226 can provide or assist with data curation from upstream services (e.g., system clients), flow normalization and/or consolidation, extensity, and/or the like.

The service infrastructure 200 can include a private platform 206 to facilitate service provider-specific (e.g., internal, proprietary, etc.) vehicle services (e.g., provided via one or more system clients (228a, 228b) associated with the service provider operations computing system) between the service provider infrastructure system 204 (e.g., operations computing system, etc.) and autonomous vehicles associated with the service provider (e.g., autonomous vehicles 208a, 208b). For example, in some embodiments, the private platform 206 can provide access to service provider services that are specific to the service provider autonomous vehicle fleet (e.g., vehicles 208a and 208b) such as fleet management services, autonomy assistance services, and/or the like.

The private platform 206 can include a gateway API (e.g., gateway API 230) to facilitate communication from the autonomous vehicles 208a, 208b to one or more service provider infrastructure services (e.g., via the public platform 202, via one or more service provider autonomous vehicle backend interfaces 234, etc.) and a vehicle API (e.g., vehicle API 232) to facilitate communication from the service provider infrastructure services (e.g., via the public platform 202, via one or more service provider autonomous vehicle backend interfaces 234, etc.) to the autonomous vehicles 208a, 208b. The private platform 206 can include one or more backend interfaces 234 associated with at least one system client (e.g., service provider vehicle-specific system clients, such as fleet management, autonomy assistance, etc.). In some embodiments, the private platform 206 can include one or more adapters 236, for example, to provide compatibility between one or more service provider autonomous vehicle backend interfaces 234 and one or more private platform APIs (e.g., vehicle API 232, gateway API 230).

In some embodiments, the service infrastructure 200 can include a test platform 218 for validating and vetting end-to-end platform functionality, without use of a real vehicle on the ground. For example, the test platform 218 can simulate trips with human drivers and/or support fully simulated trip assignment and/or trip workflow capabilities.

The service infrastructure 200 can be associated with and/or in communication with one or more third-party entity systems, such as third-party entity (e.g., Vendor X) platform 210 and third-party entity (e.g., Vendor Y) platform 212, and/or one or more third-party entity autonomous vehicles (e.g., in a third-party entity autonomous vehicle fleet) such as third-party autonomous vehicles 214a, 214, 216a, and 216b. The third-party entity platforms 210, 212 can be distinct and remote from the service provide infrastructure, and provide for management of vehicles associated with a third-party entity fleet, such as third-party entity (e.g., Vendor X) autonomous vehicles 214a, 214b and third-party entity (e.g., Vendor Y) autonomous vehicles 216a, 216b. The third-party entity (e.g., Vendor X) platform 210 and third-party entity (e.g., Vendor Y) platform 212, and/or third-party entity (e.g., Vendor X) autonomous vehicles 214a, 214b and third-party entity (e.g., Vendor Y) autonomous vehicles 216a, 216b can communicate with the service provider operations computing system 204 (e.g., system clients, etc.) via the public platform 202 to allow the third-party entity platforms and/or vehicles to access one or more service provider infrastructure services (e.g., trip services, routing services, payment services, user services, etc.).

The service infrastructure 200 can include a plurality of software development kits (SDKs) (e.g., set of tools and core libraries), such as SDKs 238, 240a, 240b, 242, 244, 246a, 246b, 248, 250a, and 250b, that provide access to the public platform 202 for use by both the service provider autonomous vehicles (208a, 208b) and the third-party entity autonomous vehicles (214a, 214b, 216a, 216b). In some implementations, all external communication with the platforms can be done via the SDKs. For example, the provider entity infrastructure can include both a public SDK and a private SDK and specific endpoints to facilitate communication with the public platform 202 and the private platform 206, respectively. In some embodiments, the service provider autonomous vehicle fleet (e.g., vehicle 208a, 208b) and/or test platform 218 can use both the public SDK and the private SDK, whereas the third-party entity autonomous vehicles (vehicle 214a, 214b, 216a, 216b) can use only the public SDK and associated endpoints. In some implementations, the SDKs can provide a single entry point into the service provider infrastructure (e.g., public platform 202, etc.), which can improve consistency across both the service provider fleet and the third-party entity fleet(s). As an example, a public SDK can provide secured access to the public platform 202 by both service provider vehicles and third-party entity (and/or systems) and access to capabilities such as trip assignment, routing, onboarding new vehicles, supply positioning, monitoring and statistics, a platform sandbox (e.g., for integration and testing), and/or the like. The private SDK can be accessed by the service provider vehicles and provide access to capabilities such as remote assistance, vehicle management, fleet management, and/or the like.

In some embodiments, the SDKs can include a command-line interface to provide an entry point into the SDK components and act as a gateway for SDK related work, integration, testing, and authentication. For example, the command-line tools can provide for bootstrapping, managing authentication, updating SDK version, testing, debugging, and/or the like. In some implementations, a command-line interface can require an authentication certificate before being able to bootstrap an SDK, download components, and/or access a service provider's services. For example, based on the authentication certificate, a command-line interface can determine which version of the SDK (e.g., public or private) to provide access to.

Figure 3:
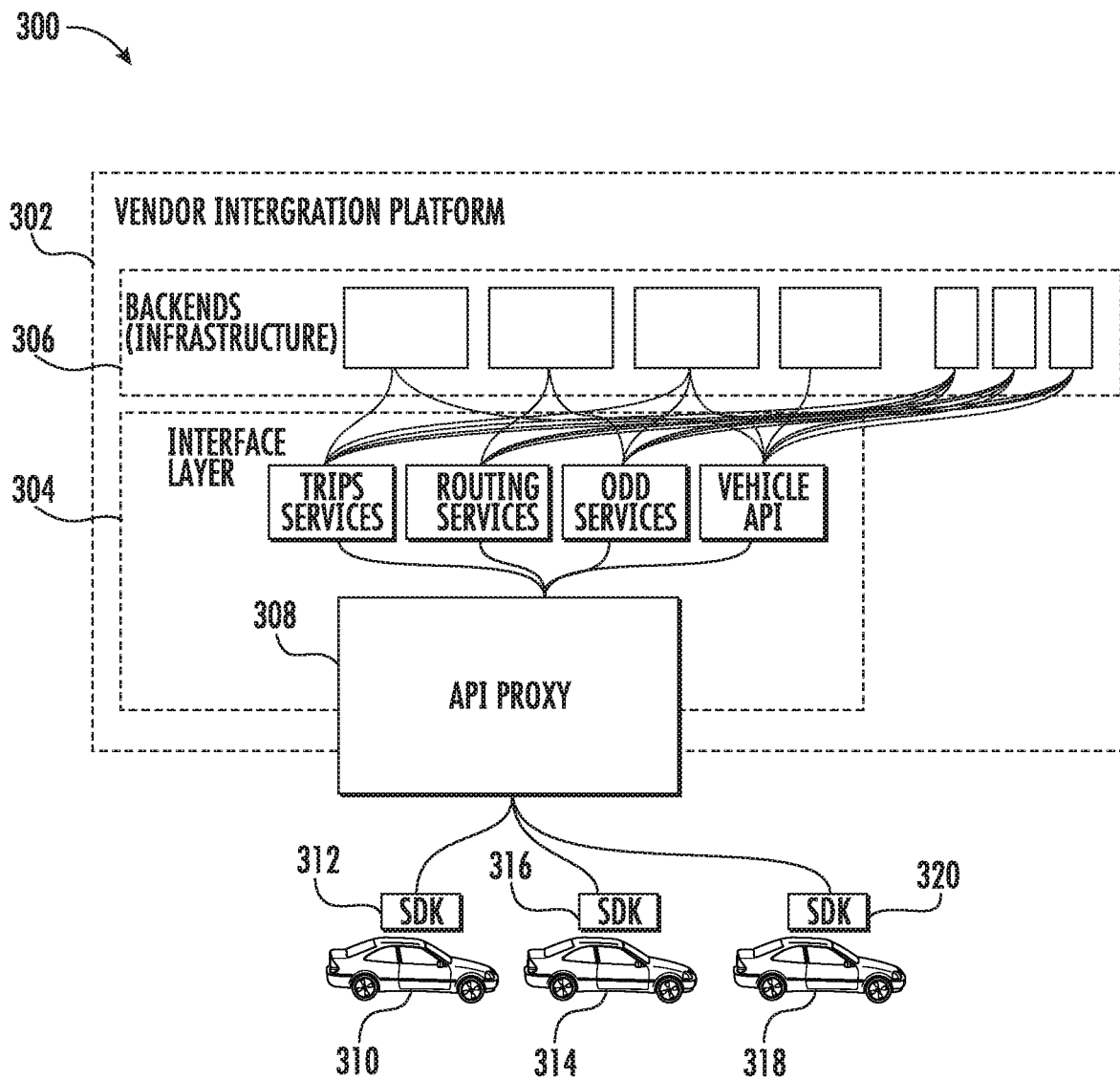
FIG. 3 depicts an example of a multiple entity integration platform according to example embodiments of the present disclosure.

FIG. 3 depicts an example of an entity integration platform 300 according to example embodiments of the present disclosure. As illustrated in FIG. 3, an entity integration platform 300 can include a vendor integration platform (e.g., public platform) 302 in communication with one or more vehicles, such as autonomous vehicles 310, 314, and 318. As described in regard to FIG. 2, the public platform 302 can provide for communication between a plurality of backend services 306 and one or more autonomous vehicles (e.g., 310, 314, and/or 318) via a plurality of interfaces 304. As such, public platform 302 of FIG. 3 can in some embodiments correspond to public platform 202 of FIG. 2, while backend services 306 and/or interfaces 304 of FIG. 3 can in some embodiments correspond to backend interfaces 224 of FIG. 2 and corresponding applications, interfaces, and the like. In some implementations, the public platform 302 can include application programming interface (API) proxy 308 to act as a central gateway to the public platform 302 for communications to/from the autonomous vehicles. In some embodiments, an autonomous vehicle (e.g., 310, 314, and/or 318) can communicate with the API proxy 308 via an SDK associated with the autonomous vehicle (e.g., SDK 312, SDK, 316, or SDK 320), as described herein.

Figure 4:
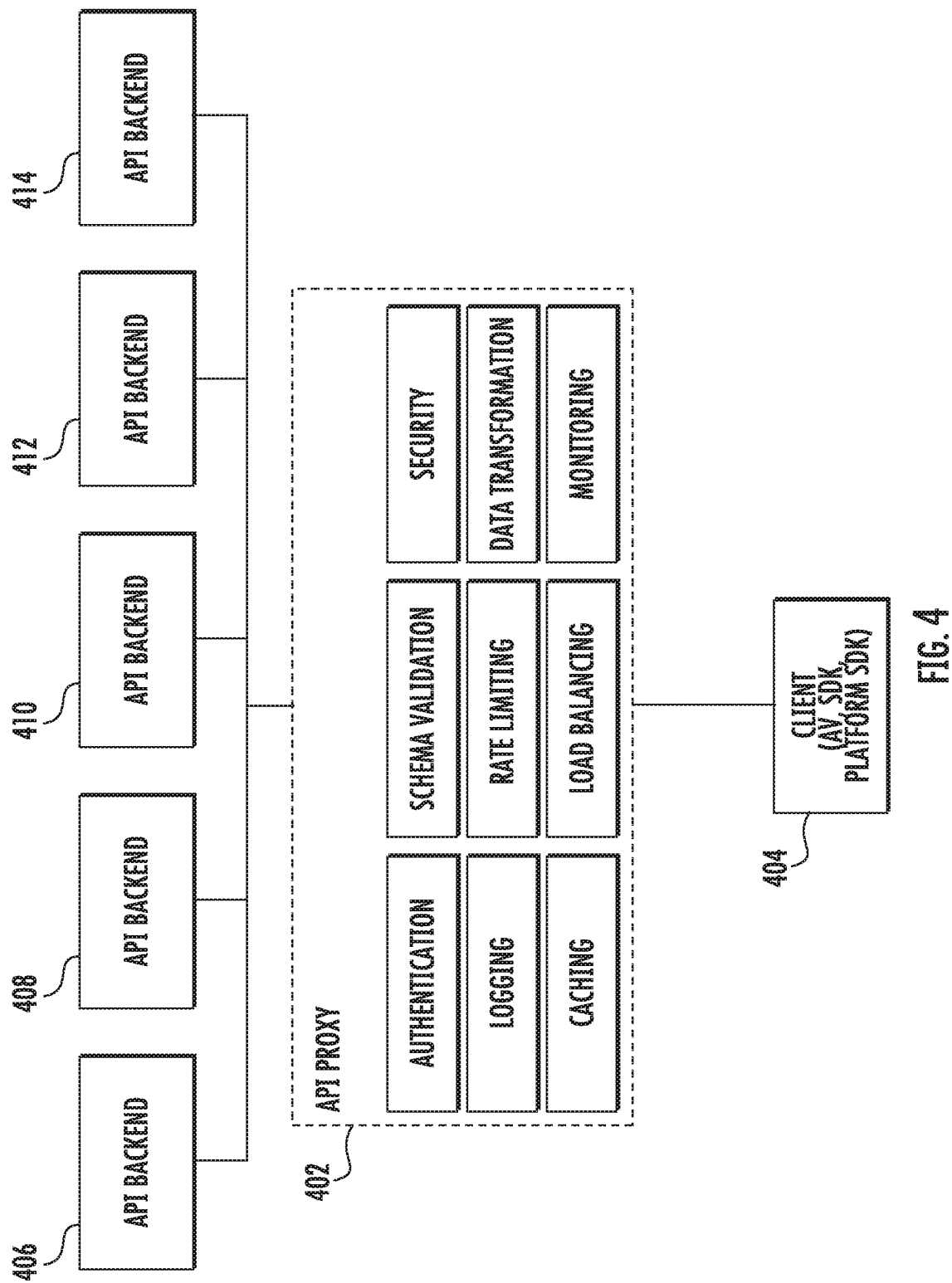
FIG. 4 depicts an example of an application programming interface proxy according to example embodiments of the present disclosure.

FIG. 4 depicts an example of an application programming interface (API) proxy associated with an entity integration platform according to example embodiments of the present disclosure. As illustrated in FIG. 4, a provider entity infrastructure (e.g., service provider public platform) 400 can include an API proxy 402 to act as a central gateway to the public platform as well as provide an API management platform to provide security, reliability, scalability, and abstraction for the backend services. For example, in some embodiments, the API proxy 402 can act as a gateway to facilitate communication between one or more autonomous vehicles (e.g., clients) 404 and one or more public platform backend interfaces, such as API backend interfaces 406-414. In some implementations, the API proxy 402 can provide services such as one or more of authentication (e.g., access control), logging, caching, schema validation, rate limiting, load balancing, security, data transformation, and/or monitoring. In some implementations, entity integration platform 400 and API proxy 402 of FIG. 4 can correspond to API proxy 308 associated with entity integration platform 300 of FIG. 3.

Figure 5:
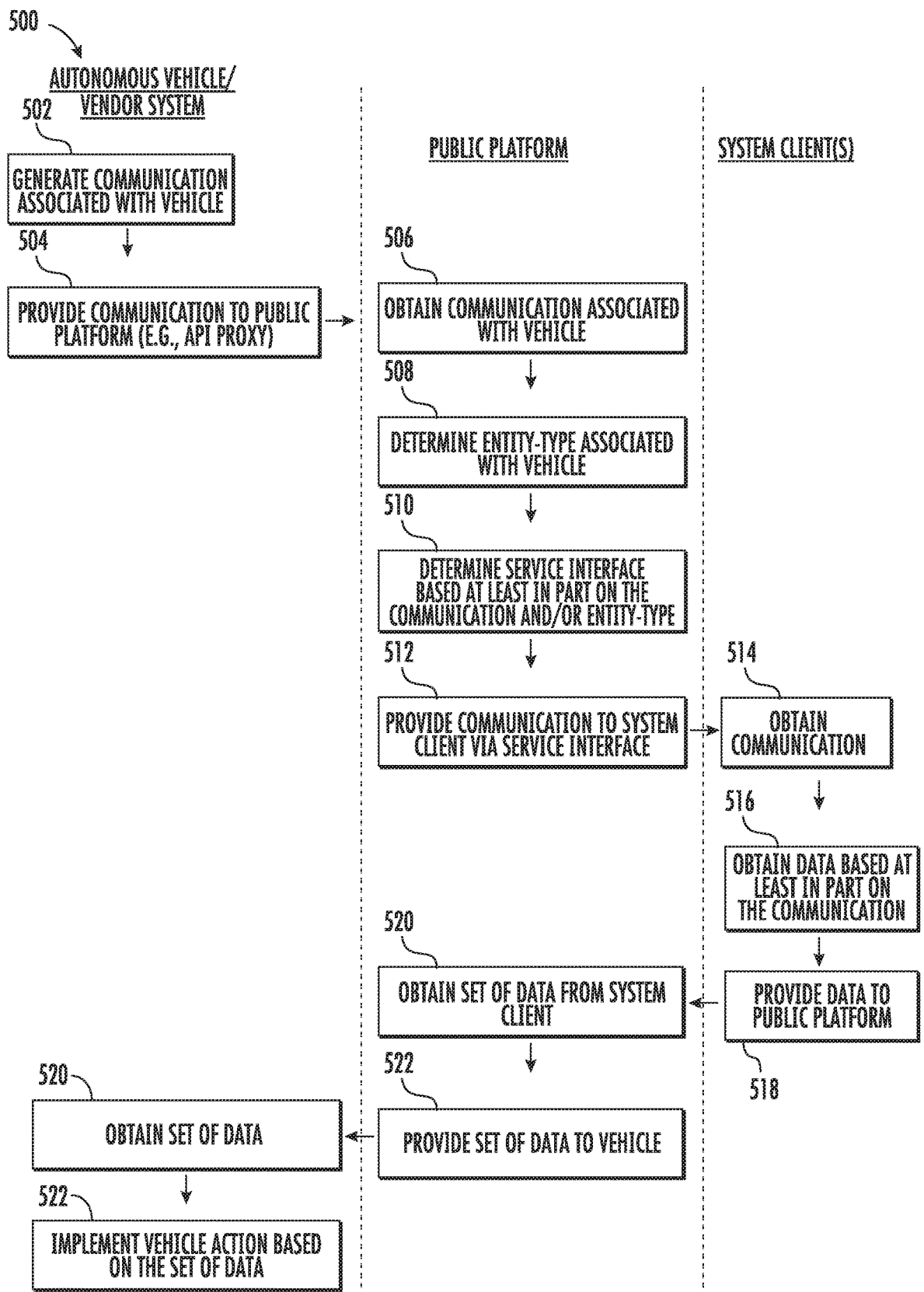
FIG. 5 depicts a flow diagram of example operations for facilitating communication between a provider system and autonomous vehicles according to example embodiments of the present disclosure.

FIG. 5 depicts a flow diagram of example operations 500 for facilitating communication between a service provider system and autonomous vehicles according to example embodiments of the present disclosure. One or more portion(s) of the operations 500 can be implemented by one or more computing systems that include, for example, a vehicle computing system (e.g., vehicle computing system 112, etc.), one or more portions of an operations computing system (e.g., computing system 104, computing system 820, public platform 202, service provider system 204, private platform 206, third-party entity platform 210, third-party entity platform 212, etc.), and/or one or more system client(s) (e.g., 228a, 228b, etc.). The portions indicated as being performed by a vehicle can also, or alternatively, be performed by a computing system that is remote from the vehicle (e.g., private platform 206, third-party entity platform 210, third-party entity platform 212, etc.). Each respective portion of the operations 500 can be performed by any (or any combination) of the computing device(s) of the respective computing system. Moreover, one or more portion(s) of the operations 500 can be implemented as an algorithm on the hardware components of the device(s) described herein (e.g., as in FIGS. 1 and 8), for example, to facilitate communication between a vehicle and a remote computing system. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 502, the operations 500 can include generating a communication associated with a vehicle (e.g., that is to be transmitted to a service provider infrastructure). For instance, a vehicle computing system 112 of a vehicle 102 can generate a communication associated with the vehicle. As described herein, the vehicle computing system 112 can be located onboard the vehicle 102. In some embodiments, the vehicle (e.g., vehicle 102) can provide data to an entity platform (e.g., service provider private platform 206, third-party entity platform 210, third-party entity platform 212, public platform 202, etc.) and the entity platform can generate a communication associated with a vehicle that is to be transmitted to a service provider infrastructure.

The communication generated at 502 can include a variety of data. For instance, the communication can include an indication that the vehicle is available to provide a vehicle service, vehicle state data associated with the vehicle, a request for routing of the vehicle, a request for assistance of the vehicle, a request for data associated with a user interface, and/or other data. In some embodiments, an API library can allow the vehicle computing system to structure its communication based on the type of data to be transmitted and/or requested (e.g., using the definitions specified by library parameters, etc.).

At 504, the operations 500 can include providing the communication to a public platform associated with a service provider (e.g., public platform 202, etc.). For instance, the autonomous vehicle (e.g. via a vehicle computing system) and/or entity platform (e.g., private platform 206, third-party entity platform 210, 212, etc.) can provide (e.g., transmit, send, make available, etc.) the communication to a public platform that is remote from the vehicle, for example via an SDK associated with the autonomous vehicle (e.g., vehicle computing system) and/or entity platform and an API proxy (and/or gateway API) associated with the public platform.

At 506, the public platform (e.g., public platform 202, etc.) can obtain the communication associated with the vehicle. For instance, the public platform can obtain a communication associated with a vehicle via an API proxy associated with the public platform and/or a gateway API associated with the public platform. This can include receiving the communication directly from the autonomous vehicle (e.g., vehicle computing system) and/or from an entity platform associated with the autonomous vehicle (e.g., private platform 206, third-party entity platform 210, 212, etc.) for example via an SDK. The public platform can be stored, maintained, implemented, etc. on an operations computing system (e.g., associated with a service provider, etc.) that is remote from the vehicle.

At 508, the operations 500 can include determining an entity type (e.g., a first entity-type, a second entity-type, etc.) with which the vehicle is associated. In some implementations, the entity-type can be determined from a predefined group of entity-types, such as but not limited to a first entity-type, a second entity-type, a third entity-type, etc. In one specific example, the predefined group of entity types can include at least a first entity-type (e.g., a first entity-type corresponding to a service provider associated with a computing system such as computing system 104, 106, 802, etc.) and a second entity-type (e.g., a second entity-type corresponding to a third-party autonomous vehicle provider). For instance, an autonomous vehicle can be associated with and/or part of a service provider vehicle fleet (e.g., a first entity-type). Alternatively, the vehicle can be associated with and/or part of a third-party entity vehicle fleet (e.g., a second entity-type).

At 510, the operations 500 can include determining a service interface based at least in part on the communication and/or the entity-type associated with the vehicle. For instance, the public platform can include a plurality of service interfaces, each associated with one or more system clients of a service provider infrastructure. In some implementations, the public platform can process the communication (e.g., the contents of the communication, the metadata associated therewith, etc.) to identify at least one service interface of the plurality of service interfaces. For example, the public platform can identify a trip service interface for a communication that requests a trip assignment, a routing service interface for a communication that requests routing data, and/or the like.

At 512, the operations 500 can include providing the communication to a system client via the frontend interface. For instance, the public platform can provide the communication associated with the vehicle to at least one system client (e.g., associated with the service provider infrastructure) via at least one of the service interfaces. In some implementations, the public platform (e.g., a service interface) can validate the communication, for example, before it is provided to the system client. The plurality of system clients can be associated with an entity (e.g., service provider), as described herein. In some implementations, the vehicle can be included in a fleet of vehicles of the entity (e.g., service provider) or in a fleet of a third-party entity. Thus, the systems and methods of the present disclosure can help the vehicles access the one or more services of the system clients associated with the service provider.

At 514, a system client (e.g., of the operations computing system in the service provider infrastructure) can obtain the communication. The system client can process the communication and perform one or more operations based on the communication, such as for example, operations associated with providing trip services, routing services, payment services, and/or the like, for the vehicle. For example, the communication can include an indication that the vehicle is available to provide a transportation service. In response, the system client can perform operations to generate a transportation service assignment for the vehicle.

At 516, the system client can obtain (e.g., generate, etc.) data (e.g., to be provided to the vehicle) based at least in part on the communication. For example, in response to a communication that includes an indication that the vehicle is available to provide a transportation service, the system client can perform operations to generate data indicative of the transportation service assignment for the vehicle. At 518, the system client can provide the data to the public platform, for example, via an adapter and/or service interface and a vehicle API associated with the public platform.

At 520, the public platform can obtain the data from the at least one system client, for example, via the adapter and/or service interface associated with the public platform. In some implementations, the public platform can be configured to validate the data. At 522, the public platform can provide the data to the vehicle and/or entity vehicle platform, for example, providing the data via a vehicle API and API proxy associated with the public platform and an SDK associated with the vehicle and/or entity vehicle platform.

At 524, the vehicle (e.g., vehicle computing system, etc.) and/or entity vehicle platform (e.g., service provider private platform, third-party entity vehicle platform, etc.) can obtain the data (e.g., from a service provide infrastructure system client) via the vehicle API/API proxy of the public platform, as described herein. In response, at 526, the vehicle (e.g., vehicle computing system) can implement one or more vehicle actions.

Figure 6:
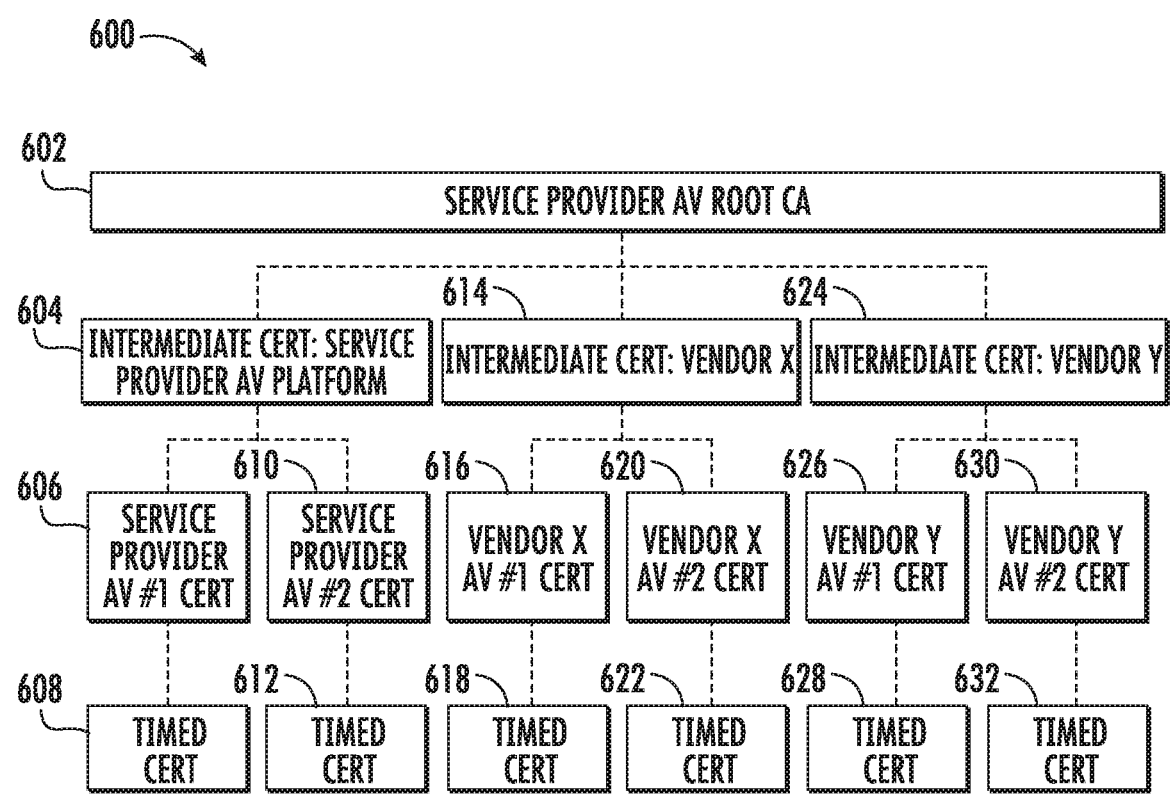
FIG. 6 depicts an example of security certificate management according to example embodiments of the present disclosure.

FIG. 6 depicts an example of security certificate management model according to example embodiments of the present disclosure. In some implementations, the platforms can provide for using a chain-based certificate authentication model 600 to provide security, whereby certificates are hierarchical and traceable. As illustrated in FIG. 6, a chain-based certificate authentication model 600 provides for using certificate chaining to establish hierarchal chains of trust that extend to each entity, and to each of the entity's autonomous vehicles. For example, the chain-based certificate authentication model 600 can establish a service provider root certificate authority 602. The service provider root certificate authority 602 can establish intermediate level certificates for each autonomous vehicle entity platform, such as the service provider autonomous vehicle platform certificate 604, a third-party entity (e.g., Vendor X) vehicle platform certificate 614, and a third-party entity (e.g., Vehicle Y) vehicle platform certificate 624. Each of the intermediate level certificates can have one or more associated certificates established for each autonomous vehicle associated with the entity. For example, as illustrated, the service provider autonomous vehicle platform certificate 604 can have associated certificates 606 and 610 assigned to a first and second autonomous vehicle within the service provider's fleet. The third-party entity (e.g., Vendor X) vehicle platform certificate 614 can have associated certificates 616 and 620 assigned to a first and second autonomous vehicle within the third-party entity (e.g., Vendor X)'s fleet. The third-party entity (e.g., Vendor Y) vehicle platform certificate 624 can have associated certificates 626 and 630 assigned to a first and second autonomous vehicle within the third-party entity (e.g., Vendor Y's) fleet. In some implementations, each of the autonomous vehicle certificates can be associated with a limited duration certificate, such as timed certificates 608, 612, 618, 622, 628, and 632. The chain-based certificate authentication model 600 can allow for revoking a certificate for a single autonomous vehicle (e.g., certificate 606, certificate 610, certificate 616, certificate 620, certificate 626, or certificate 630) and/or for revoking a certificate for an entire entity's vehicle fleet (e.g., certificate 604, certificate 614, or certificate 624). The chain-based certificate authentication model 600 can provide for preventing a vehicle and/or an entity from accessing the public platform until the certificate credentials are reinstated.

Figure 7C:
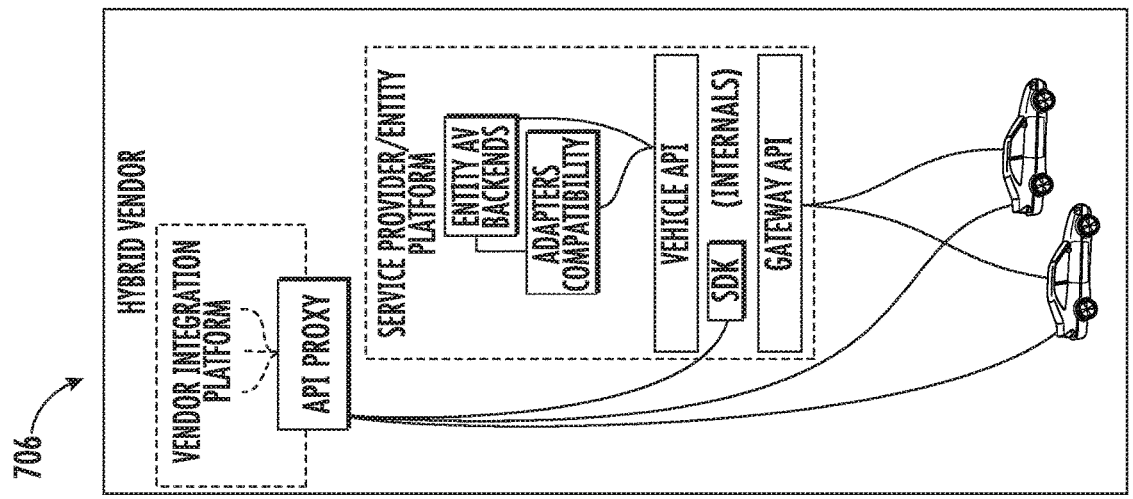
FIGS. 7A-7C depict example communication modes according to example embodiments of the present disclosure.
Figure 7B:
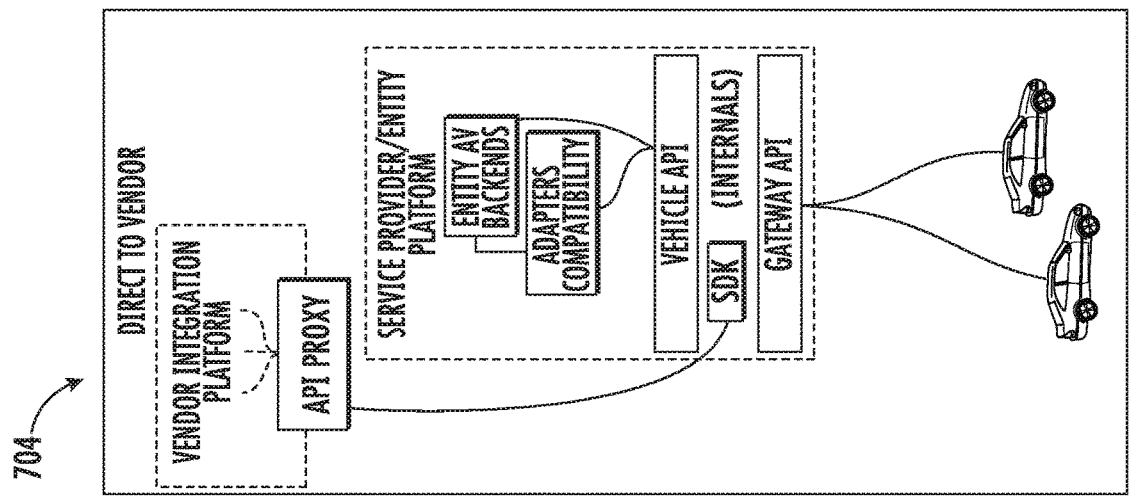
Figure 7A:
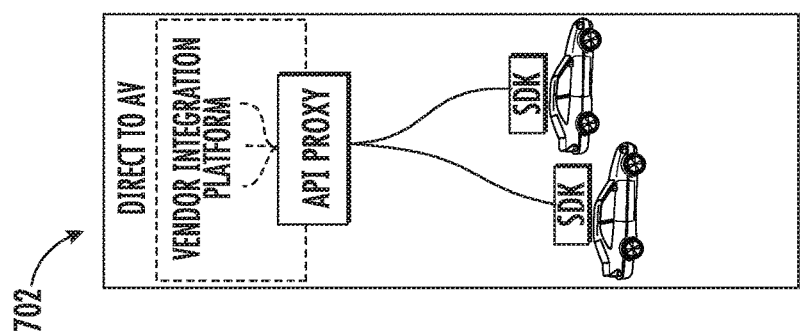

FIGS. 7A through 7C depict example communication modes 702-706 according to example embodiments of the present disclosure. As illustrated in FIGS. 7A through 7C, in some embodiments, the public platform (e.g., public platform 202 of FIG. 2) can provide for different modes of communication between autonomous vehicles and/or other systems (e.g., private platform, third-party vendor systems, autonomous vehicles, etc.) and the service provider infrastructure (e.g., public platform 202, service provider system 204). For example, the public platform can provide for a direct-to-vehicle communication mode 702, a direct-to-vendor communication mode 704, and/or a hybrid vendor communication mode 706.

As illustrated in FIG. 7A, a direct-to-vehicle communication mode 702 can be provided whereby an autonomous vehicle can connect directly to the public platform. For example, in some embodiments, the autonomous vehicle SDK can connect to the public platform API proxy as shown to facilitate communication between the autonomous vehicle and the service provider infrastructure.

As illustrated in FIG. 7B, a direct-to-vendor communication mode 704 can be provided whereby an autonomous vehicle can communicate directly with a respective vehicle services system (e.g., private platform, third-party entity autonomous vehicle platform, etc.) and that respective vehicle services system can connect to the public platform. For example, a SDK associated with a vehicle services system (e.g., private platform, third-party entity autonomous vehicle platform, etc.) can connect to the public platform API proxy to facilitate communication between an autonomous vehicle and the service provider infrastructure.

As illustrated in FIG. 7C, a hybrid vendor communication mode 706 can be provided whereby both direct-to-vehicle and direct-to-vendor communication modes can be supported. For example, in some embodiments, a hybrid vendor communication mode 706 may provide for some communications (e.g., normal communications) to be provided through a direct-to-vendor communication mode (e.g., 704 of FIG. 7B) and other communications (e.g., time-sensitive communications) to be provided through a direct-to-vehicle communication mode (e.g., 702 of FIG. 7A).

Figure 8:
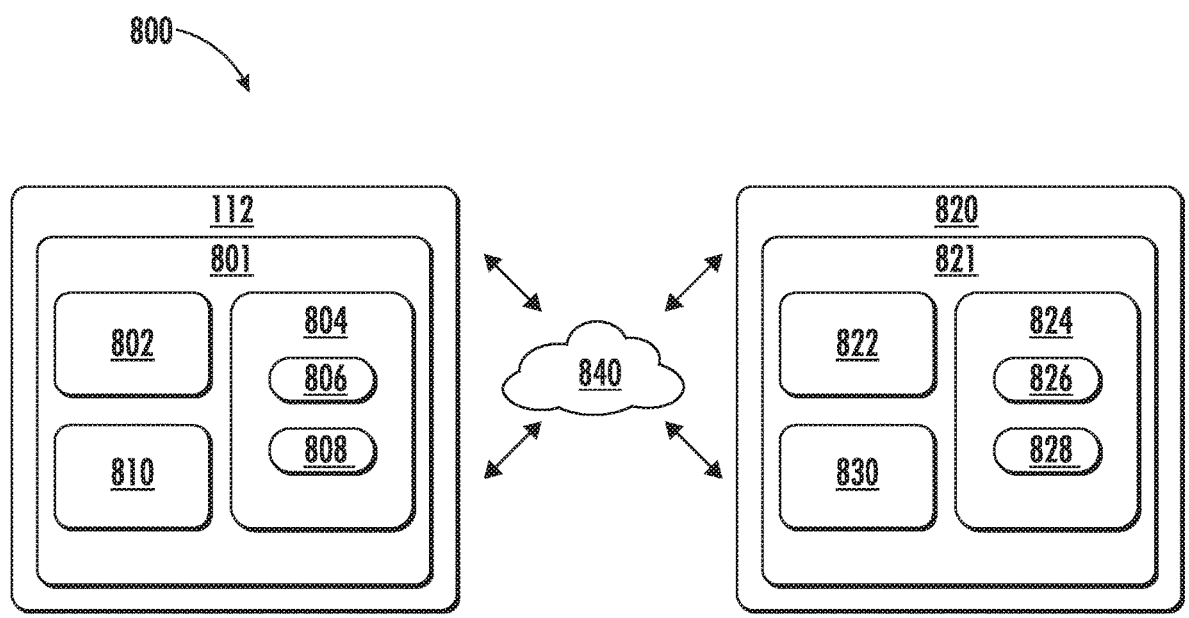
FIG. 8 depicts a block diagram of an example computing system according to example embodiments of the present disclosure.

FIG. 8 depicts a block diagram of an example computing system 800 according to example embodiments of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The example system 800 can include the vehicle computing system 112 of the autonomous vehicle 102 and a remote computing system 820 (e.g., operations computing system, other computing system, etc. that is remote from the vehicle 102) that can be communicatively coupled to one another over one or more network(s) 840. The remote computing system 820 can be and/or include the operations computing system 104 and/or remote computing system 106 of FIG. 1. The remote computing system 820 can be associated with a central operations system and/or an entity associated with the vehicle 102 such as, for example, a vehicle owner, vehicle manager, fleet operator, service provider, etc. For instance, the remote computing system 820 can be or otherwise include the remote computing system 104 described herein.

The computing device(s) 801 of the vehicle computing system 112 can include processor(s) 802 and at least one memory 804. The one or more processors 802 can be any suitable processing device (e.g., a processor core, a microprocessor, an ASIC, a FPGA, a controller, a microcontroller, etc.) and can be one processor or a plurality of processors that are operatively connected. The memory 804 can include one or more non-transitory computer-readable storage media, such as RAM, ROM, EEPROM, EPROM, one or more memory devices, flash memory devices, magnetic disks, data registers, etc., and combinations thereof.

The memory 804 can store information that can be accessed by the one or more processors 802. For instance, the memory 804 (e.g., one or more non-transitory computer-readable storage mediums, memory devices) can include computer-readable instructions 806 that can be executed by the one or more processors 802. The instructions 806 can be software written in any suitable programming language or can be implemented in hardware. Additionally, or alternatively, the instructions 806 can be executed in logically and/or virtually separate threads on processor(s) 802.

For example, the memory 804 on-board the vehicle 102 can store instructions 806 that when executed by the one or more processors 802 cause the one or more processors 802 (e.g., in the vehicle computing system 112) to perform operations such as any of the operations and functions of the computing device(s) 801 and/or vehicle computing system 112, any of the operations and functions for which the vehicle computing system 112 is configured, and/or any other operations and functions described herein.

The memory 804 can store data 808 that can be obtained (e.g., received, accessed, written, manipulated, created, generated, etc.) and/or stored. The data 808 can include, for instance, services data (e.g., trip data, route data, user data, etc.), sensor data, map data, perception data, prediction data, motion planning data, object states and/or state data, object motion trajectories, feedback data, fault data, log data, and/or other data/information as described herein. In some implementations, the computing device(s) 801 can obtain data from one or more memories that are remote from the autonomous vehicle 102.

The computing device(s) 801 can also include a communication interface 810 used to communicate with one or more other system(s) (e.g., the remote computing system 820). The communication interface 810 can include any circuits, components, software, etc. for communicating via one or more networks (e.g., network(s) 840). In some implementations, the communication interface 810 can include, for example, one or more of a communications controller, receiver, transceiver, transmitter, port, conductors, software, and/or hardware for communicating data.

The remote computing system 820 can include one or more computing device(s) 821. The computing device(s) 821 can include one or more processors 822 and at least one memory 824. The one or more processors 822 can be any suitable processing device (e.g., a processor core, a microprocessor, an ASIC, a FPGA, a controller, a microcontroller, etc.) and can be one processor or a plurality of processors that are operatively connected. The memory 824 can include one or more tangible, non-transitory computer-readable storage media, such as RAM, ROM, EEPROM, EPROM, one or more memory devices, flash memory devices, data registers, etc., and combinations thereof.

The memory 824 can store information that can be accessed by the one or more processors 822. For instance, the memory 824 (e.g., one or more tangible, non-transitory computer-readable storage media, one or more memory devices, etc.) can include computer-readable instructions 826 that can be executed by the one or more processors 822. The instructions 826 can be software written in any suitable programming language or can be implemented in hardware.

Additionally, or alternatively, the instructions 826 can be executed in logically and/or virtually separate threads on processor(s) 822.

For example, the memory 824 can store instructions 826 that when executed by the one or more processors 822 cause the one or more processors 822 to perform operations such as any of the operations and functions of the operations computing system 104, the remote computing system 106, the remote computing system 820 and/or computing device(s) 821 or for which any of these computing systems are configured, as described herein, and/or any other operations and functions described herein.

The memory 824 can store data 828 that can be obtained and/or stored. The data 828 can include, for instance, services data (e.g., trip data, route data, user data etc.), data associated with autonomous vehicles (e.g., vehicle data, maintenance data, ownership data, sensor data, map data, perception data, prediction data, motion planning data, object states and/or state data, object motion trajectories, feedback data, fault data, log data, etc.), third-party entity data, inventory data, scheduling data, log data, attribute data, scenario data, training data, and/or other data/information as described herein. In some implementations, the computing device(s) 821 can obtain data from one or more memories that are remote from the remote computing system 820.

The computing device(s) 821 can also include a communication interface 830 used to communicate with one or more other system(s) (e.g., the vehicle computing system 112, etc.). The communication interface 830 can include any circuits, components, software, etc. for communicating via one or more networks (e.g., network(s) 840). In some implementations, the communication interface 830 can include, for example, one or more of a communications controller, receiver, transceiver, transmitter, port, conductors, software, and/or hardware for communicating data.

The network(s) 840 can be any type of network or combination of networks that allows for communication between devices. In some embodiments, the network(s) 840 can include one or more of a local area network, wide area network, the Internet, secure network, cellular network, mesh network, peer-to-peer communication link, and/or some combination thereof, and can include any number of wired or wireless links. Communication over the network(s) 840 can be accomplished, for instance, via a communication interface using any type of protocol, protection scheme, encoding, format, packaging, etc.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for facilitating vehicle communications, the method comprising:
    obtaining, by a computing system comprising one or more computing devices, a communication associated with an autonomous vehicle via an application programming interface platform, wherein the application programming interface platform comprises (i) a first plurality of vehicle services interfaces that are associated with first system clients and second system clients and (ii) one or more second vehicle services interfaces that are associated with the first system clients but not associated with the second system clients;
    in response to obtaining the communication, authenticating, by the computing system, the autonomous vehicle as one of a first entity-type corresponding to a service provider that manages the application programming interface platform associated with the computing system or second entity-type corresponding to a third-party autonomous vehicle provider;
    in response to the autonomous vehicle being authenticated as the first entity-type corresponding to the service provider that manages the application programming interface platform, providing, by the computing system and via a vehicle services interface of the first plurality of vehicle services interfaces, the communication associated with the autonomous vehicle to a system client of the first system clients and second system clients; and
    in response to the autonomous vehicle being authenticated as the second entity-type corresponding to the third-party autonomous vehicle provider, providing, by the computing system and via a vehicle services interface of the one or more second vehicle services interfaces, the communication associated with the autonomous vehicle to a system client of the first system clients.

2. The computer-implemented method of claim 1, further comprising:
    obtaining, by the computing system, data from the system client of the first system clients intended for the autonomous vehicle at one of the first plurality of vehicle services interfaces; and
    providing, by the computing system via the application programming interface platform, the data to the autonomous vehicle.

3. The computer-implemented method of claim 1, further comprising:
    obtaining, by the computing system, data from the system client of the first system clients intended for an entity vehicle platform associated with the autonomous vehicle at one of the first plurality of vehicle services interfaces; and
    providing, by the computing system via the application programming interface platform, the data to the entity vehicle platform associated with the autonomous vehicle.

4. The computer-implemented method of claim 1, wherein the first plurality of vehicle services interfaces and the one or more second vehicle services interfaces comprise interfaces to access first system clients, the first system clients comprising one or more of:

autonomous vehicle trip assignment services associated with the service provider;

autonomous vehicle routing services associated with the service provider;

autonomous vehicle supply positioning services associated with the service provider; or autonomous vehicle monitoring services associated with the service provider.

5. The computer-implemented method of claim 1, wherein obtaining the communication associated with the autonomous vehicle via the application programming interface platform further comprises obtaining the communication via a direct communication between an endpoint configured to employ a software development kit associated with one or more of the autonomous vehicle or an autonomous vehicle service provider system and the application programming interface platform.

6. The computer-implemented method of claim 1, wherein obtaining the communication associated with the autonomous vehicle via the application programming interface platform further comprises obtaining the communication via an application programming interface proxy associated with the application programming interface platform.

7. The computer-implemented method of claim 6, wherein the application programming interface proxy provides one or more of the following capabilities: authentication; security; logging; schema validation; caching; rate limiting; load balancing; data transformation; or monitoring.

8. The computer-implemented method of claim 1, wherein obtaining the communication associated with the autonomous vehicle via the application programming interface platform further comprises validating one or more of a security certificate associated with a third-party autonomous vehicle provider or a security certificate associated with the autonomous vehicle.

9. The computer-implemented method of claim 1, wherein the first plurality of vehicle services interfaces comprise interfaces to access second system clients, the second system clients comprising one or more of:

fleet management services associated with the service provider;

vehicle management services associated with the service provider; or remote autonomy assistance services associated with the service provider.

10. A computing system comprising:

one or more processors; and one or more memories including instructions that, when executed by the one or more processors, cause the one or more processors to perform operations, the operations comprising:

obtaining a communication associated with an autonomous vehicle via an application programming interface platform, wherein the application programming interface platform comprises (i) a first plurality of vehicle services interfaces that are associated with first system clients and second system clients and (ii) one or more second vehicle services interfaces that are associated with the first system clients but not associated with the second system clients;

in response to obtaining the communication, authenticating the autonomous vehicle as one of a first entity-type corresponding to a service provider that manages the application programming interface platform associated with the computing system or a second entity-type corresponding to a third-party autonomous vehicle provider;

in response to the autonomous vehicle being authenticated as the first entity-type corresponding to the service provider that manages the application programming interface platform, providing via a vehicle services interface of the first plurality of vehicle services interfaces, the communication associated with the autonomous vehicle to a system client of the first system clients and second system clients; and in response to the autonomous vehicle being authenticated as the second entity-type corresponding to the third-party autonomous vehicle provider, providing via a vehicle services interface of the one or more second vehicle services interfaces, the communication associated with the autonomous vehicle to a system client of the first system clients.

11. The computing system of claim 10, the operations further comprising:

obtaining data from the system client of the first system clients intended for the autonomous vehicle at one of the first plurality of vehicle services interfaces; and providing, via the application programming interface platform, the data to one or more of the autonomous vehicle or an entity vehicle platform associated with the autonomous vehicle.

12. The computing system of claim 10, the operations further comprising:

obtaining data from the system client of the first system clients intended for an entity vehicle platform associated with the autonomous vehicle at one of the first plurality of vehicle services interfaces; and providing, via the application programming interface platform, the data to the entity vehicle platform associated with the autonomous vehicle.

13. The computing system of claim 10, wherein the first plurality of vehicle services interfaces and the one or more second vehicle services interfaces comprise interfaces to access first system clients, the first system clients comprising one or more of:

autonomous vehicle trip assignment services associated with the service provider;

autonomous vehicle routing services associated with the service provider;

autonomous vehicle supply positioning services associated with the service provider; or autonomous vehicle monitoring services associated with the service provider.

14. The computing system of claim 10, wherein obtaining the communication associated with the autonomous vehicle via the application programming interface platform further comprises obtaining the communication via a direct communication between an endpoint configured to employ a software development kit associated with one or more of the autonomous vehicle or an autonomous vehicle service provider system and the application programming interface platform.

15. The computing system of claim 10, wherein obtaining the communication associated with the autonomous vehicle via the application programming interface platform further comprises obtaining the communication via an application programming interface proxy associated with the application programming interface platform.

16. The computing system of claim 10, wherein obtaining the communication associated with the autonomous vehicle via the application programming interface platform further comprises validating one or more of a security certificate associated with a third-party autonomous vehicle provider or a security certificate associated with the autonomous vehicle.

17. The computing system of claim 10, wherein the first plurality of vehicle services interfaces comprise interfaces to access second system clients, the second system clients comprising one or more of:

fleet management services associated with the service provider;
vehicle management services associated with the service provider; or
remote autonomy assistance services associated with the service provider.

18. An infrastructure system comprising:
a first integration platform comprising:
   a first plurality of vehicle services interfaces configured to facilitate communication with one or more first system clients associated with the infrastructure system and a first autonomous vehicle associated with a first entity-type corresponding to a service provider that manages the infrastructure system;
   a first plurality of application programming interfaces configured to facilitate communication with the first plurality of vehicle services interfaces;
a second integration platform which is different than the first integration platform, comprising:
   a second plurality of vehicle services interfaces configured to facilitate communication with one or more second system clients associated with the infrastructure system and a second autonomous vehicle associated with a second entity-type corresponding to a third-party autonomous vehicle provider;
   a second plurality of application programming interfaces configured to facilitate communication with the second plurality of vehicle services interfaces; and
one or more computing systems, the one or more computing systems comprising:
   one or more processors; and
   one or more memories including instructions that, when executed by the one or more processors, cause the one or more processors to perform operations, the operations comprising:
      obtaining, via the first integration platform or the second integration platform, a communication associated with the first autonomous vehicle or the second autonomous vehicle;
      determining a first vehicle services interface of the first plurality of vehicle services interfaces based at least in part on the communication associated with the first autonomous vehicle or a second vehicle services interface of the second plurality of vehicle services interfaces based at least in part on the communication associated with the second autonomous vehicle and the second entity-type; and
      providing the communication to at least one of the one or more system clients associated with the infrastructure system via the first vehicle services interface or the second vehicle services interface.

19. The infrastructure system of claim 18, the operations further comprising:
   obtaining data intended for one or more of the first autonomous vehicle or an entity vehicle platform associated with the first autonomous vehicle, from a system client, at one of the first plurality of vehicle services interfaces;
   providing the data to the one or more of the first autonomous vehicle or the entity vehicle platform associated with the first autonomous vehicle via the first integration platform.

20. The infrastructure system of claim 18, wherein the first integration platform further comprises a first application programming interface proxy that provides a gateway to the first integration platform and the second integration platform further comprises a second application programming interface proxy that provides a gateway to the second integration platform.

* * * * *